UNITED STATES PATENT OFFICE.

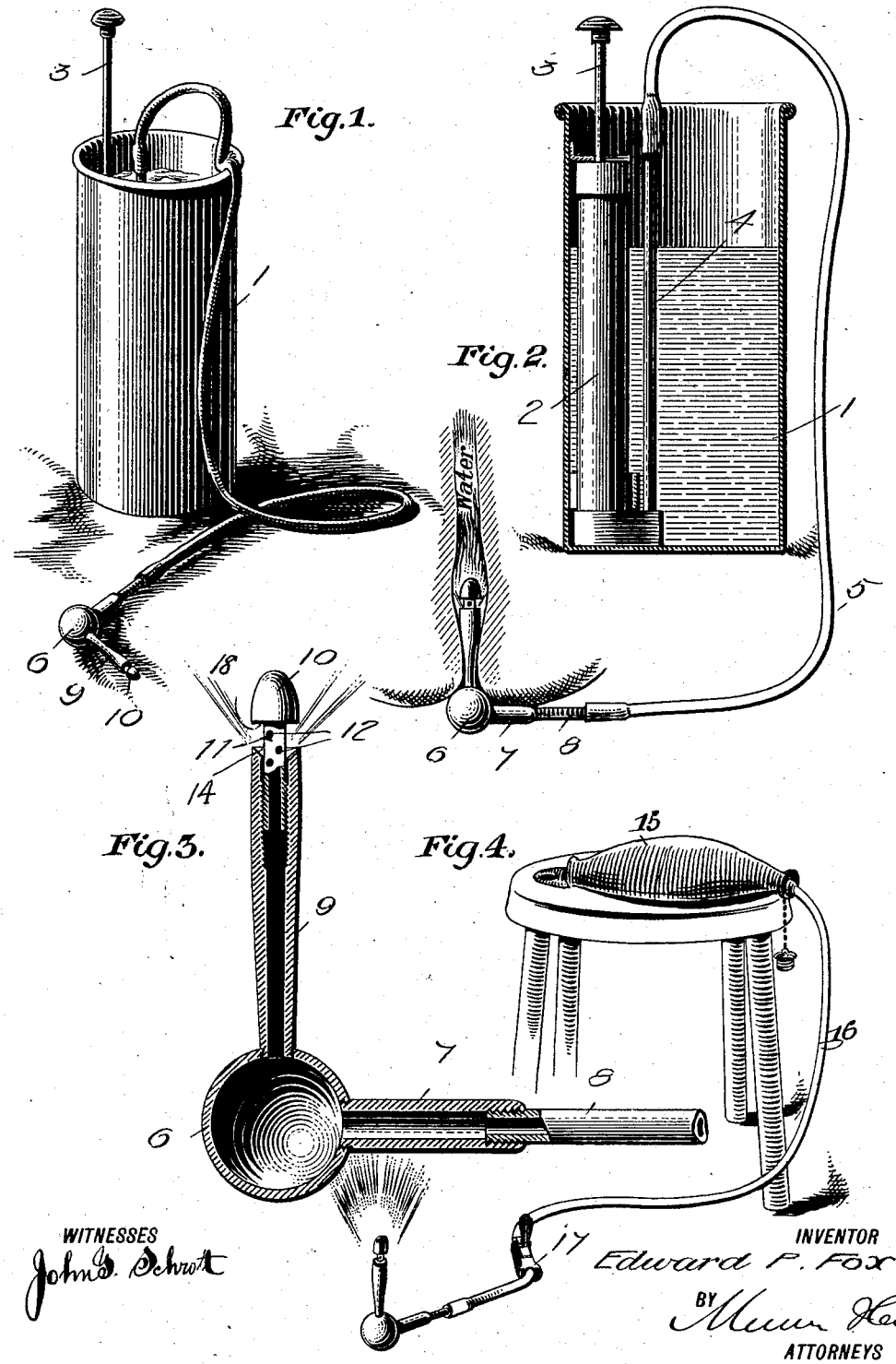

EDWARD P. FOX, OF LAKE ARTHUR, LOUISIANA.

IRRIGATING DEVICE.

1,274,702. Specification of Letters Patent. Patented Aug. 6, 1918.

Application filed October 9, 1917. Serial No. 195,605.

*To all whom it may concern:*

Be it known that I, EDWARD P. FOX, a citizen of the United States, and a resident of Lake Arthur, in the parish of Jefferson Davis and State of Louisiana, have invented new and useful Improvements in Irrigating Devices, of which the following is a specification.

My invention is an improvement in irrigating devices, and it consists in certain novel constructions and combinations of parts as will be hereinafter described and claimed.

In the drawing:

Figure 1 is a perspective view of the apparatus ready for use;

Fig. 2 is a sectional view of the apparatus as in use;

Fig. 3 is a detailed perspective view of the irrigator proper;

Fig. 4 is a perspective view showing a somewhat different construction within the broad principles of my invention.

In the embodiment of the invention shown in Figs. 1 to 3, inclusive, a container 1 is provided, of metal or the like, and within this container is arranged a pump 2, the said pump being of ordinary construction and having a plunger whose stem is indicated at 3, and a discharge pipe indicated at 4. The container is adapted to hold a suitable fluid for irrigating purposes, and the said fluid is pumped by the pump from the container through the discharge tube 4.

A hose or pipe 5 is connected with the pipe 4 at one end of the said hose or pipe, and the other end of the hose or pipe is connected with a suitable irrigating nozzle shown more particularly in Fig. 3. This nozzle, as shown, comprises a ball or casing 6, the said ball being hollow, as shown, and a nipple 7 is threaded into an opening in the casing wall, the outer end of the nipple 7 being internally threaded to receive a connector 8, which connects the hose 5 with the pipe 7. The nozzle comprises a tube 9, which is inserted into an opening in the ball 6, and this opening is at a point ninety degrees from the nipple 7.

It will be noticed that the tube 9 is tapering, the small end of the tube being engaged with the ball 6. The outer end of the tube is internally threaded, as shown.

A head 10 is provided for coöperating with the outer end of the tube to close or partially close the same, and the said head is rounded, as shown, and is provided with a hollow stem 11. This stem 11 is threaded to engage within the end of the tube, and has radial openings indicated at 12, said openings being arranged longitudinally of the stem, and in staggered relation, and it will be evident that by turning the tube and the stem with respect to each other, that is, by turning the stem in the tube, more or less of the opening 11 may be uncovered, to provide for a larger or smaller flow of the liquid.

A shoulder 18 is formed between the head and the stem, and this shoulder is adapted to abut the end of the tube 9, to close the tube when the stem is turned entirely into the tube.

In operation, the nozzle is introduced into the part to be irrigated, as indicated in Fig. 2, and the ball or casing 6 acts on a plug or stopper to prevent the outflow of the water or other liquid in use. By means of the pump, the liquid may be forced into the parts, and may be held from flowing out by means of the ball, which acts as a valve. By turning the head, the flow of liquid may be varied, and it will be noticed that the beveled surface 14 at the outer end of the tube 9 constrains the liquid to strike the surface to be irrigated at about an angle of forty-five degrees. There is no direct flow against the parts that might cause injury.

In Fig. 4 the device is shown in connection with an ordinary hot water bottle 15, having the usual discharge tube 16 controlled by the usual clamp 17. The nozzle indicated at 18 is the same as that shown in Figs. 1 to 3. With this construction the liquid may be forced into the parts to be irrigated by pressing on the bottle, thereby compressing it to force out the water.

It will be understood that the tube 9 is rigid to facilitate introduction.

I claim:

In an irrigating device, a discharge nozzle consisting of a rigid tube, a head having a hollow stem provided with openings arranged at intervals in a series extending approximately longitudinally of the stem, said stem having threaded engagement with one end of the tube, the head being adapted to close the tube when the head is turned home, the end of the tube adjacent to the head being internally beveled to provide for an angular discharge of irrigating liquid, a spherical casing with which the tube is connected, said casing being hollow and having a nipple for connection with the container for the liquid and adapted to be used as an obturator when the tube is introduced.

EDWARD P. FOX.